Oct. 23, 1962 N. G. CLEVELAND 3,059,266
MAGNETIC RECORD PROCESSING APPARATUS
Filed April 28, 1961 6 Sheets-Sheet 1

INVENTOR
NORMAN G. CLEVELAND

BY K. P. Johnson
ATTORNEY

Oct. 23, 1962 N. G. CLEVELAND 3,059,266

MAGNETIC RECORD PROCESSING APPARATUS

Filed April 28, 1961 6 Sheets-Sheet 6

United States Patent Office 3,059,266
Patented Oct. 23, 1962

3,059,266

MAGNETIC RECORD PROCESSING APPARATUS

Norman G. Cleveland, Minneapolis, Minn., assignor to International Business Machines Corporation, New York, N.Y., a corporation of New York Filed Apr. 28, 1961, Ser. No. 106,253
22 Claims. (Cl. 15—308)

This invention relates generally to magnetic record apparatus and more particularly to apparatus for detecting and correcting surface irregularities of magnetic record members that cause erroneous recording or sensing of data magnetically stored therein.

Record members such as magnetic tapes are widely used for the storage of digital information in the form of discrete magnetized areas or spots. These magnetized areas are produced by moving the magnetic oxide surface of the tape closely adjacent to a record or write head which controls the polarity of magnetic flux according to a code which represents data to be recorded. When this stored data is to be recovered, the record tape is passed closely adjacent to a sensing device commonly called a read head. Each magnetized area changes the flux in the read head core so that current is induced in the read head coil to produce a voltage variation representative of the stored data bit. To insure that information is accurately recorded and sensed, the recording surface of the tape must be maintained at a constant distance from the recording and sensing heads so that the voltage signals representative of the data may be distinguished from noise which constantly causes minor voltage variations in the read coil.

Magnetic tapes are moved at high speed past the recording and sensing heads and either in contact with the heads or separated therefrom by a thin air film. Extraneous particles, e.g., oxide or metallic particles, present on the moving tape recording surface will vary the tape-to-head gap and produce errors in recording or sensing. Therefore, newly manufactured tapes must be carefully inspected for the presence of extraneous matter or voids on the oxide coating forming the recording surface of the tape. If tape defects are not found before a tape is put into use, considerable time and expense will be encountered in attempting to correct errors in records resulting from defects on the tape at a later time. Furthermore, while a tape is in use, these errors are extremely difficult to locate.

The usual tape inspection procedure involves two phases. The first is that of recording test data on the tape, sensing the recorded data, and when the recorded and sensed data differ, to produce an error signal indicating a defect on the surface. The error signal is then utilized to stop the defective portion of surface at an inspection station. The second phase of the procedure is to inspect the defective area of the tape and either clean or reject that portion of the tape depending upon whether there is extraneous matter causing the error signal or whether there is a void in the oxide coating on the tape.

Heretofore, the latter phase of the procedure was accomplished by an operator who microscopically examined the surface of the tape and performed any cleaning or rejection that was required to remedy the defect.

If extraneous surface particles were found they could usually be removed by carefully shearing particles from the tape surface. An attempt at removal was made by the operator who then had to reverse the tape transport mechanism and retest the portion of cleaned tape to determine that the defect had been corrected. If a void was found in the oxide surface, the tape was rejected. This procedure proved to be slow and costly because of the time spent by the operator to perform the manual examination.

Experience with this procedure showed, however, that nearly all surface defects were due to particles on the tape surface and that the particles could be removed by shearing. Rarely were defects due to voids in the magnetic oxide.

Even though the tape surface is passed through wiping devices and over perforated plates prior to recording and sensing test data, some particles adhere tenaciously enough to remain on the surface so that supplementary cleaning is required. The oxide coating is relatively soft and must be carefully cleaned so that the coating proper is not removed from the base material of the tape. In order to avoid injury to the tape coating, the removal of particles still cling to the surface is performed only while the tape is stopped. These particles can then be scraped free with a sharp blade and avoid injury to the coating. Blades cannot be used while the tape is in motion because the tape tension varies and the tape flutters while in transit. Combined tension variation and tape flutter are likely to cause the blades to produce unacceptable gouges in the coating. Furthermore, because of the tenacity with which some particles adhere, they are best removed by sharp blades. But blade sharpness can not be maintained against a moving tape due to the abrasive oxide coating. Therefore, blade sharpness can be prolonged by cleaning the tape only while stopped.

Accordingly, a principal object of this invention is to provide apparatus for selectively cleaning a magnetic record member.

Another important object of this invention is to provide apparatus for detecting and cleaning only defective areas of a magnetic record member.

Another object of this invention is to provide processing apparatus for detecting defective portions of a magnetic record member and repetitively cleaning those portions as necessary to remove the defects.

Another object of this invention is to provide processing apparatus for detecting defective portions of a magnetic record member, selectively cleaning those defective portions, and examining the cleaned portions to determine whether or not the defects have been corrected.

Still another object of this invention is to provide processing apparatus for detecting a defective portion of a magnetic record member and cleaning and examining the defective portion repetitively, as necessary, to determine that the defect has been corrected.

Still another object of this invention is to provide processing apparatus for a magnetic record member which detects a defective portion of the member and repetitively cleans the defective portion for a predetermined number of times and upon failure to correct the defect, moves the defective portion to a manual examination station.

Yet another object of this invention is to provide an improved device for shearing extraneous particles from the surface of a magnetic record member.

A further object of this invention is to provide a device which is intermittently operable to clean only selected areas of the record member.

A still further object of this invention is to provide a device for cleaning extraneous particles from a magnetic record member by shearing and scraping the surface of the member in two opposite directions.

In accordance with the foregoing objects, this invention provides transport means for moving the record member in operative association with an error detection means which determines whether the record member can be recorded with the desired data and so store that data for subsequent recovery. When an error is detected, first control means are operative to move the defective portion of the record member to a cleaning means, to control the transport means and stop the member portion at the cleaning means, and to activate the cleaning means only on the defective portion of the record member. After the defective area of the tape has been cleaned, a reversing means responsive to the completion of a cleaning cycle causes the transport means to return the defective portion of the tape into operative relationship with the detection means which subsequently re-examines the cleaned portion and determines whether or not the defect has been corrected. Should the defect still exist, the defective area will be stopped again at the cleaning means which is actuated in another attempt to remove the defect from the record member. The repetitive cleaning and reexamination continue as long as necessary to remove the defect or until the defective area has been cleaned a predetermined number of times as determined by counter means which ever occurs first. Should the defect be corrected by the cleaning means prior to reaching the predetermined count, reset means are provided to reset the counter means preparatory to the detection of a subsequent defective area on the record member. In the instance that the defect was not removed by repetitious cleaning, the counter means is operable, upon reaching the predetermined count, to render the first control means ineffective and condition a second control means for moving the cleaned defective portion of the record member to a manual examination station and there stop the transport means.

When a defective portion of the record member is moved to the cleaning means and stopped thereat, a drive means is operated by a drive control means to move a support having a pair of shearing members thereon into engagement with the defective surface area so that the shearing members oscillate in contact with the member surface to loosen extraneous particles adhering to the surface. The drive means are then controlled so as to move the support with its scraping members into an inoperative position while the cleaned portion is re-examined to see whether the defect has been corrected.

This invention has the advantages of cleaning only specified areas of the record member and of reducing the examination time required of an operator by correcting most of the defective areas without operator intervention. The defective areas of the record member are also cleaned with a uniform shearing action decreasing the possibility of accidentally gouging the oxide coating as an operator might do. Further, the selective, intermittent operation of the cleaning means avoids premature dulling of the shearing members.

This invention has the feature of continuing the inspection process as soon as the defect has been corrected by the cleaning means. No operator intervention is necessary to reset the detection means or transport means. If an error is determined to be uncorrectable by the cleaning means, the control of future processing is then transferred to the operator. The operator may then attempt to correct the defective surface condition and return the corrected portion of the record member for reprocessing by the apparatus of the invention.

The foregoing and other objects, features and advantages of the invention will be apparent from the following more particular description of a preferred embodiment of the invention, as illustrated in the accompanying drawings.

Figure 3:
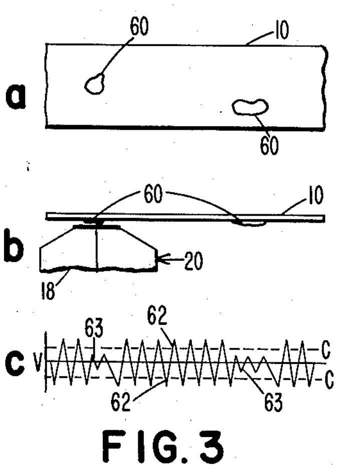

FIGS. 3*a*–3*c* are diagrams of surface defects on a magnetic record member and of the effect on sensing a record member having such defects.

Figure 4:
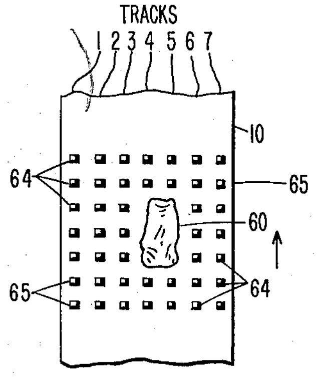

FIG. 4 is a schematic illustration of recorded data on a multi-channel record member with a defect thereon.

Figure 1:
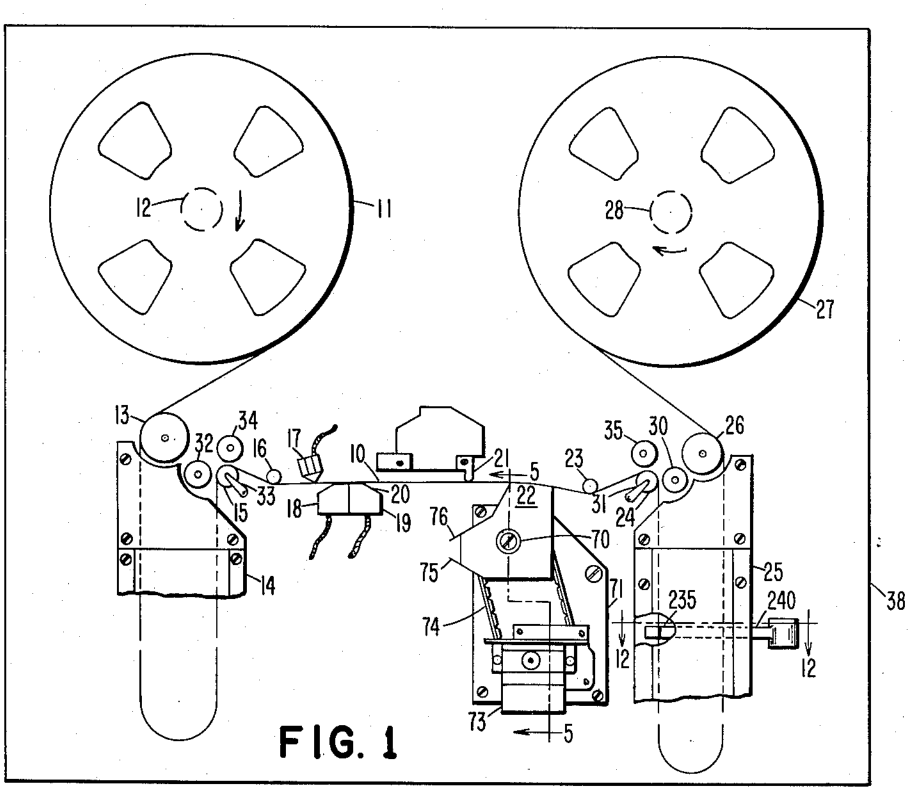
FIG. 1 is an elevational view of the record member processing apparatus embodying the invention.
Figure 5:
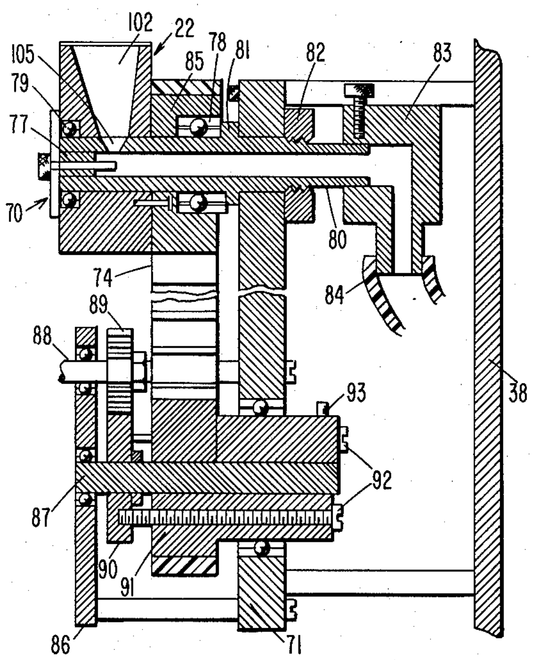

FIG. 5 is a sectional view of the cleaning device taken along lines 5—5 of FIG. 1.

Figure 6:
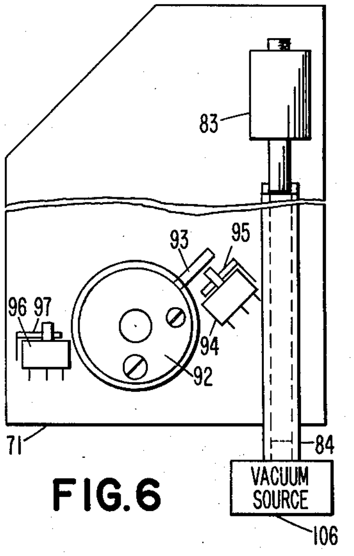

FIG. 6 is a rear elevational view of the cleaning device of FIG. 5.

Figure 7:
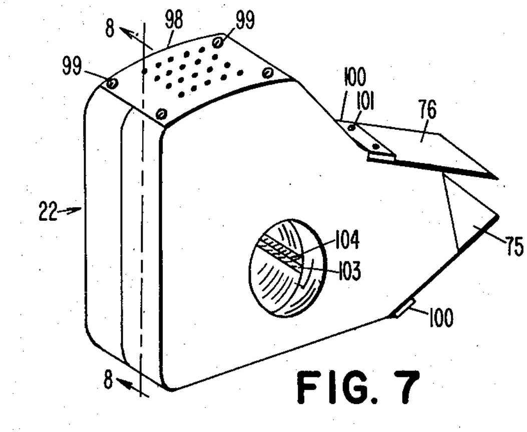

FIG. 7 is a perspective view of the cleaning head for the cleaning device.

Figure 8:
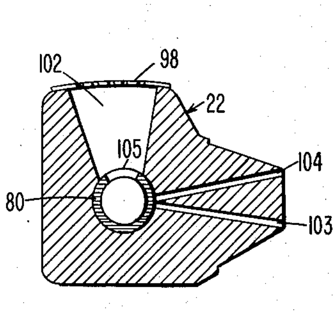

FIG. 8 is a sectional view of the cleaning head taken along the line 8—8 of FIG. 7.

Figure 9:
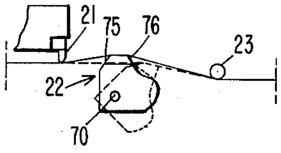

FIG. 9 is a schematic illustration of the cleaning head blades in contact with the magnetic record member.

Figure 10A:
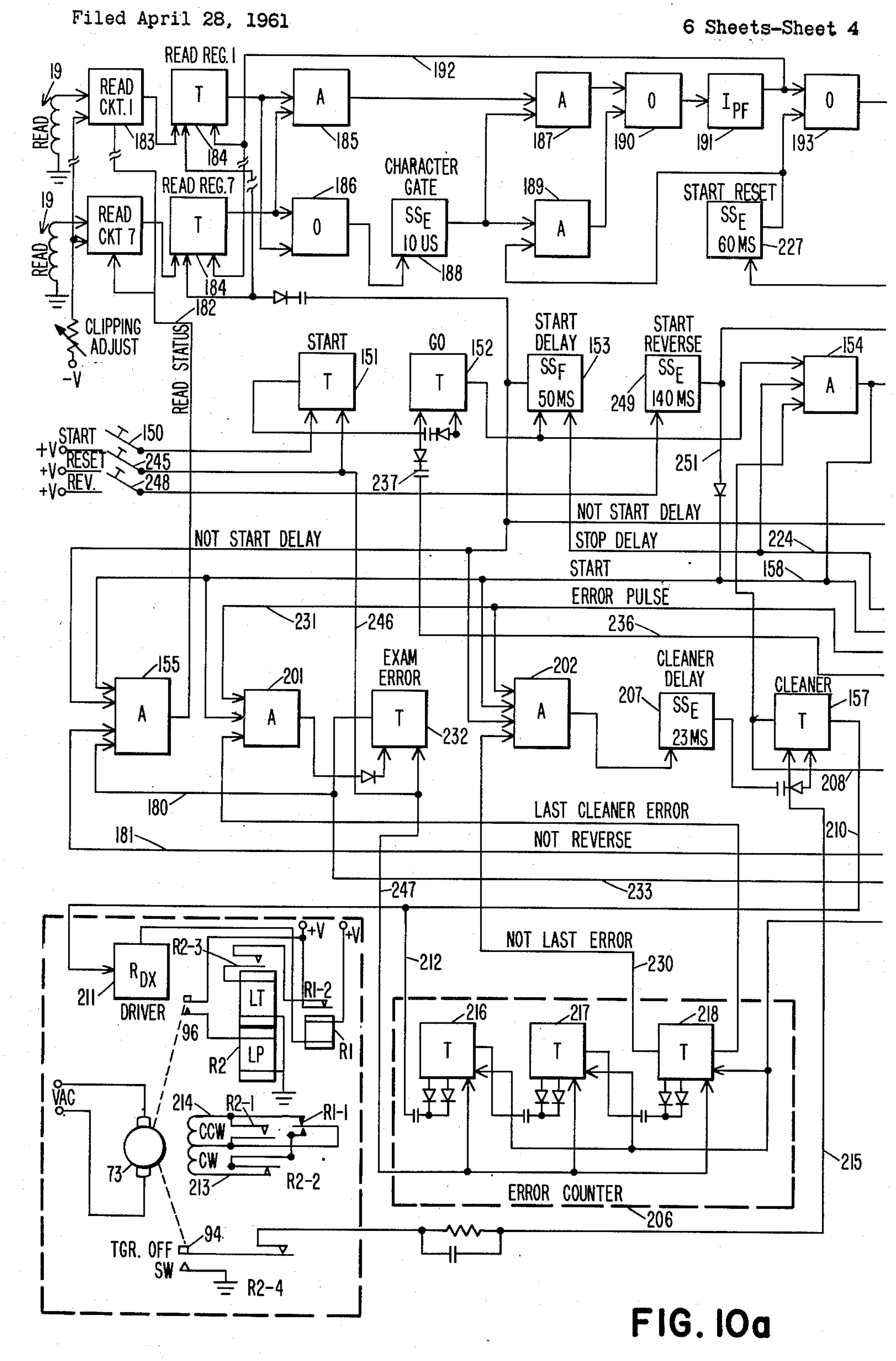
Figure 10B:
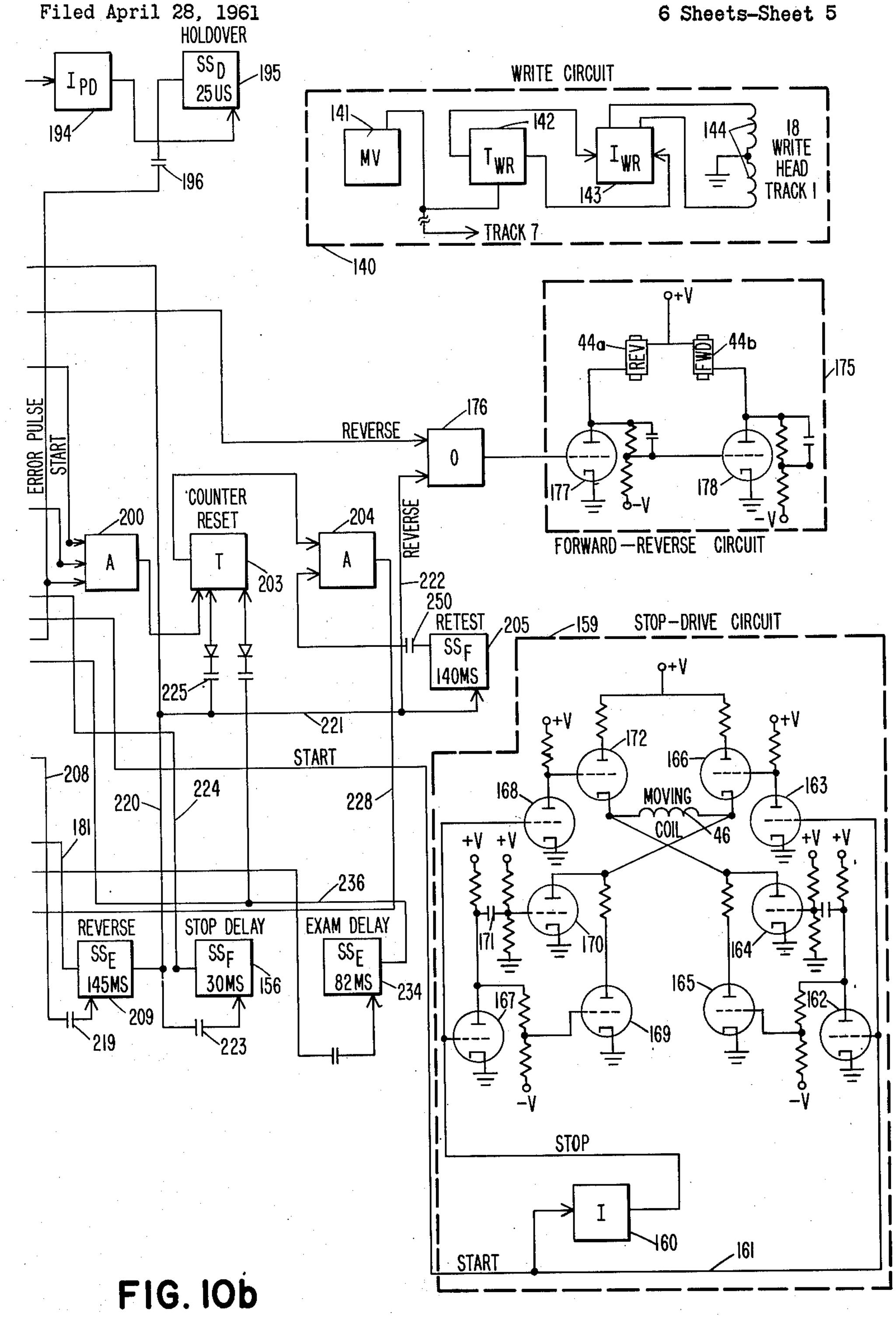

FIGS. 10*a* and 10*b* are a schematic diagram of electrical circuits for detecting defects in a magnetic record member and controlling the cleaning and re-examination of the record member.

Figure 11:
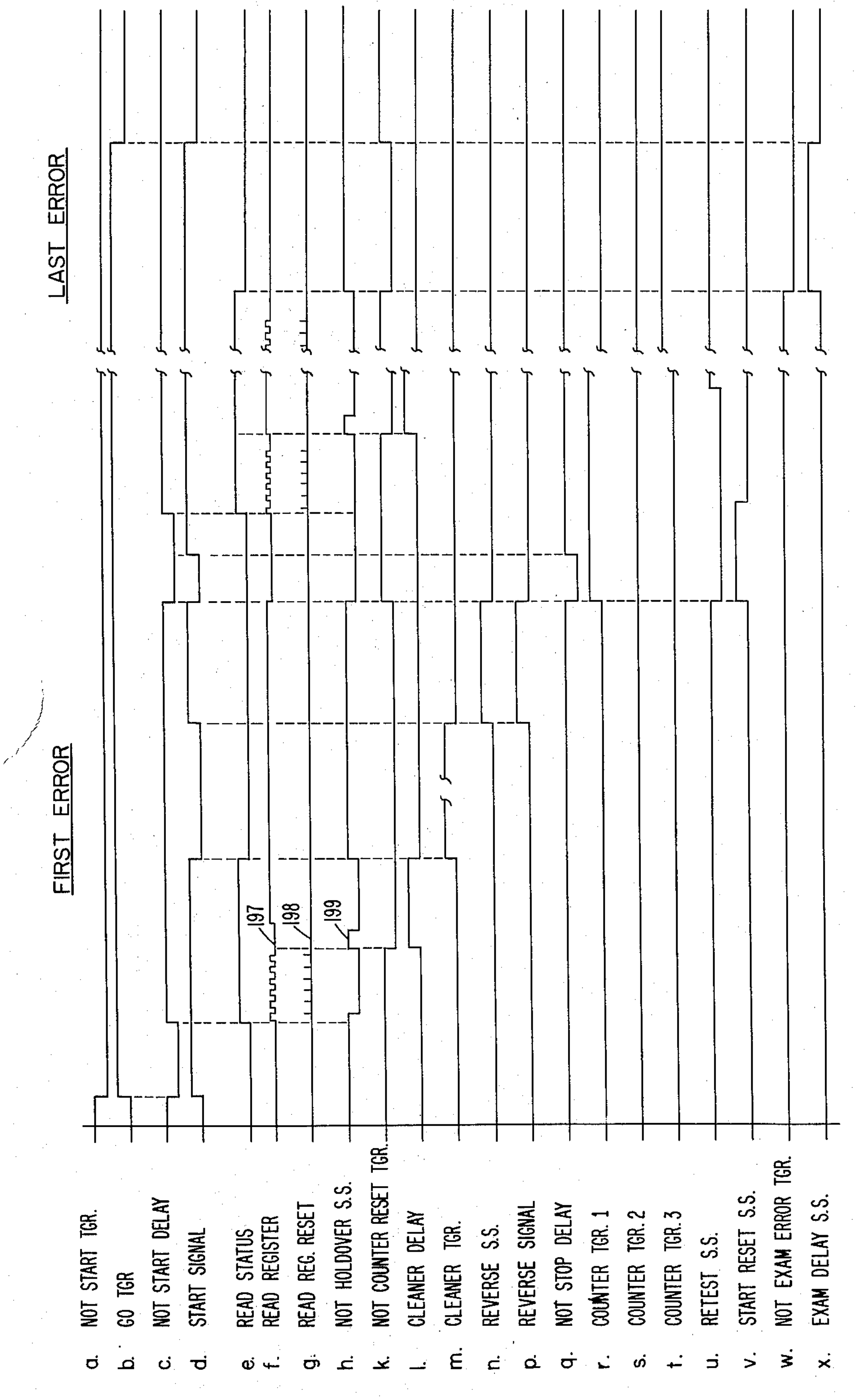

FIG. 11 is a timing diagram for the electrical circuits shown in FIGS. 10*a* and 10*b*.

Figure 12:
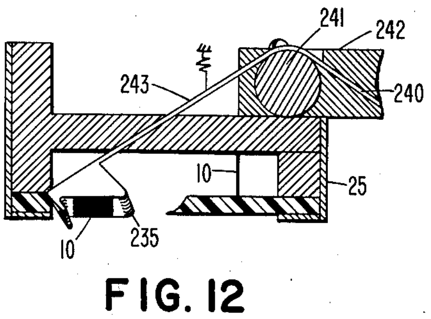

FIG. 12 is a top view of the mechanism for manually examining defective areas of a magnetic record member taken along the line 12—12 of FIG. 1.

For the inspection of a magnetic tape a tape transport apparatus is used to move a tape past write and read heads for recording and sensing data magnetically on the tape, and, if a defect is detected, the defective area is moved to a cleaning device where it is stopped and cleaned. The cleaned area is then returned to the write and read heads for re-examination to determine whether or not the defect has been corrected by the cleaning operation.

For the purpose of illustration of the invention the magnetic tape transport apparatus shown is generally like that described in detail in U.S. Patent No. 2,792,217, issued on May 14, 1957 to J.A. Weidenhammer, et al.; therefore, only so much of the transport apparatus as is necessary and pertinent to the invention will be shown and described here.

With reference to FIG. 1, magnetic recording tape 10, to be inspected, is fed from supply reel 11 mounted on rotatable shaft 12 into the left-hand vacuum column 14 around guide idler 13 to form a loop in the vacuum column. The tape then proceeds over the left-hand tape moving idler pulley 15 under idler 16, past erase head 17, over write head 18 and read head 19, designated together as 20, under fixed guide bar 21, over cleaning head 22, under idler 23, over the right-hand tape moving idler pulley 24, forming a loop in the right-hand vacuum column 25, and is wound on take-up or machine reel 27 mounted on rotatable shaft 28 after passing over right-hand guide idler 26.

Tape 10 is fed in a forward direction from vacuum column 14 to vacuum column 25 by positioning tape moving idler pulley 24 into contact with drive capstan 30, which is constantly rotating in a counter-clockwise direction, so that the tape is fed downward into vacuum column 25. Pulley 24 is mounted on arm 31 which is pivotally supported in the tape transfort unit and is actuated for oscillatory movement by control signals to be described below. Tape 10 is moved in a reverse direction by diengaging tape moving idler pulley 24 from drive capstan 30 and engaging tape moving idler pulley 15 with drive captan 32 at the left side of the unit which is constantly rotating in a clockwise direction. The engagement of pulley 15 with capstan 32 is accomplished by oscillating arm 33 about its pivot. With either of pulleys 15 or 24 engaged with their respective drive capstans, 32 or 30, the tape will move in one direction or the other into an adjacent vacuum column. The tape is stopped by disengaging the engaged tape moving idler pulley and moving the opposite idler pulley into engagement with stationary stop capstan 34 or 35. Tape moving idler pulleys 15 and 24 on their respective movable arms 33 or 31 are connected to a common operating linkage which may be controlled with electrical signals for moving the tape in either direction or stopping the tape as desired.

Figure 2:
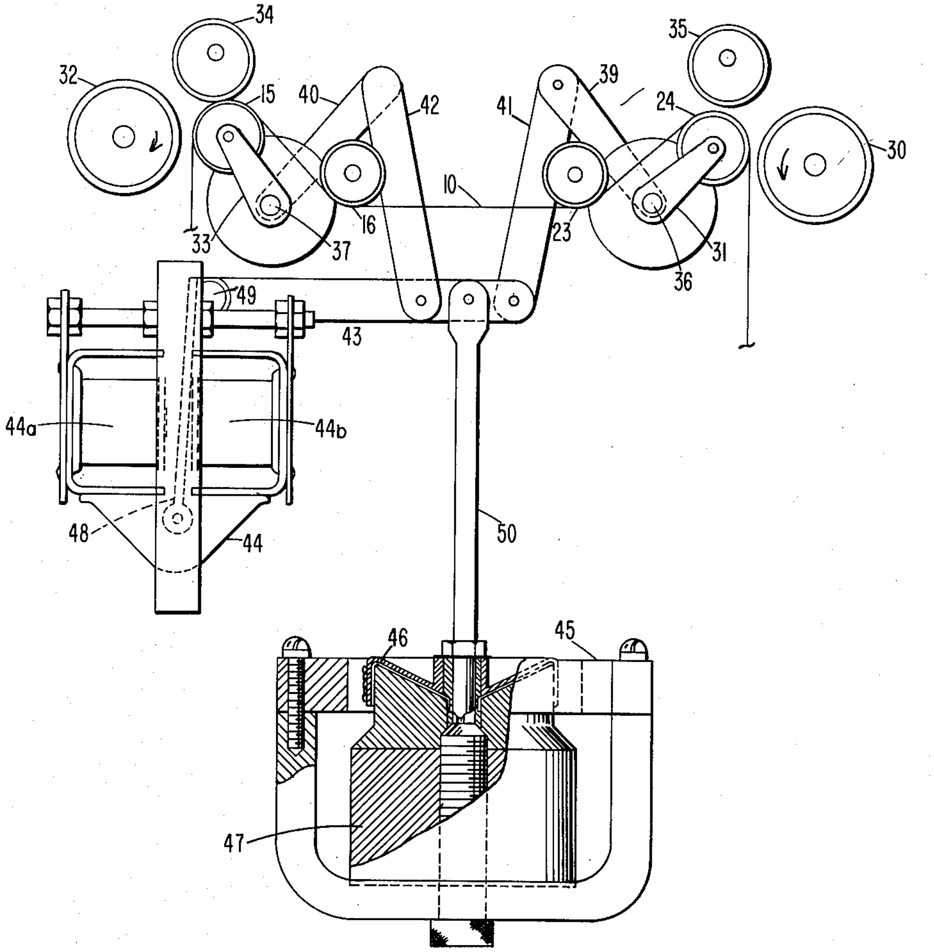
FIG. 2 is a diagrammatic view of the record member driving mechanism with means for stopping or moving the member in a forward or reverse direction.

The common operating linkage connecting pulleys 15 and 24, and arms 33 and 31 is used to move tape 10 along its path over write and read heads 20, cleaning head 22 and under idlers 16 and 23 and is shown in FIG. 2. This mechanism is the same as that shown in the aforementioned patent to Weidenhammer et al., and will be only briefly described to provide an understanding of how the tape motion is controlled during tape inspection with this invention. As previously mentioned, drive capstans 30 and 32 are constantly rotating; capstan 30 rotates by its shaft in a counterclockwise direction and capstan 32 rotates by its shaft in a clockwise direction. These shafts are rotated by a motor driving through a belt-pulley arrangement (not shown). Tape moving idler pulleys 24 and 15 are each mounted for rotation at the free end of levers 31 and 33, respectively. The inner ends of levers 31 and 33 are fixed to pivot shafts 36 and 37, respectively. The pivot shafts 36 and 37 are journaled for rocking movement in face panel 38 and each of these shafts has attached thereto a short, upwardly extending link, 39 or 40, respectively. The inner, free ends of links 39 and 40 have pivoted thereto levers 41 and 42, respectively, which have their opposite ends pivoted to a common operating lever 43.

With the foregoing structure, each tape moving idler pulley 24 or 15 may be selectively engaged with its related drive capstan or stop capstan. Thus, tape moving idler pulley 24 may be brought into contact with forward drive capstan 30 or with reverse stop capstan 35; tape moving idler pulley 15 may be selectively engaged with reverse drive capstan 32 or with forward stop capstant 34. The stop capstans 35 and 34 are eccentrically mounted in panel 38 by means of screws about which the capstans may be adjusted to vary their braking effect.

Tape moving idler pulleys 24 and 15 are brought into contact with the several control capstans by first biasing common operating lever 43 either to the right or left for tape direction control and then moving the operating lever upward or downward to a respective drive or stop position. The movement of lever 43 is accomplished by appropriately energizing control magnets with electrical signals.

In order to impart controlled movement to the tape moving idler pulleys 24 and 15, there is provided a forward-reverse actuator 44 comprising a pair of aligned, high speed relay magnets **44*a* and 44*b* and a stop or drive actuator 45 which consists of a coil 46 in a field of high flux density caused by a permanent magnet 47. The high speed relay coils 44*a* and 44*b* are mounted on a supporting yoke in opposed relation to each other and with the provision of a space between the magnets to accommodate a pivoted armature 48 to the free end of which operating lever 43 is attached by means of a pivot stud 49. Coil 46 of the stop-drive actuator has affixed thereto a rod 50 which is connected to the operating lever 43 midway between the connections of levers 41 and 42**.

When relay magnet **44*b* is energized, armature 48 will be attracted thereto and operating lever 43 will be biased to the right. This elevates tape moving idler pulley 15 a half gap width above the tape moving idler pulley 24. When stop-drive actuator 45 is energized to repel coil 46 thereof, an upward thrust will be delivered to rod 50. This will further move the drive linkage to force the tape moving idler pulleys downwardly and outwardly until tape moving idler pulley 24 is engaged with forward drive capstan 30. This will cause tape 10 to be driven downwardly into vacuum control column 25**.

Forward tape motion is stopped by engaging tape moving idler pulley 15 with stop capstan 34 and disengaging tape moving idler pulley 24 from forward drive capstan 30, as shown in FIG. 2. To achieve this function, magnet **44*b* must remain energized, but the flow of current through stop-drive actuator 45 is reversed whereby coil 46 is attracted to permanent magnet 47. This results in a downward pull on rod 50. Such pull on the linkage system will tend to raise both tape moving idler pulleys 24 and 15, but since tape moving idler pulley 15 in the forward drive position was higher than pulley 24, idler pulley 15 engages the forward stop capstan 34 to brake tape movement. Engagement between tape moving idler pulley 15 and its forward stop capstan 34 results from the upward bias given to the tape moving idler pulley 15 under the influence of magnet 44*b***.

To bias tape moving idler pulley 15 into contact with reverse drive capstan 48, it is necessary to energize magnet **44*a*. This attracts armature 48 and pulls operating lever 43 to the left. This will serve to drop tape moving idler pulley 15 one-half gap below idler pulley 24 and condition tape moving idler pulley 15 for engagement with the reverse drive capstan 32 when moving coil 46 is energized to cause an upward movement of rod 50. Such movement will serve to project tape moving idler pulley 15 into engagement with reverse drive capstan 32, whereby tape 10 is driven in the reverse direction into vacuum column 14**.

The reverse stop position of the tape drive mechanism is achieved when tape moving idler pulley 24 is brought into engagement with reverse stop capstan 35. This is accomplished by maintaining magnet **44*a* energized and reversing the current in moving coil 46 so that the coil is pulled downwardly to exert a downward pull on rod 50 and operating lever 43 with a consequent upward bias of the tape moving idler pulley 24 into contact with reverse stop capstan 35**.

From the foregoing description it can be seen that upon applying appropriate electrical signals to moving coil 46 and to forward-reverse magnets **44*a* and 44*b*, tape 10 can be stopped or moved in either direction over write-read heads 20 and cleaning head 22**.

Illustrated in FIGS. 3*a* and 3*b* is a section of tape 10 having adhering to its recording surface extraneous particles 60 which may be flakes of oxide, metal or other material. As the section moves at high speed across write head 18 and read head 19 (FIG. 3*b*), a particle 60 causes the tape proper to move away from the heads increasing the normal tape-to-head gap.

Assuming, for example, that write head 18 has applied to the tape a single track of magnetizing pulses representing a sequence of identical data bits, the resulting voltage signal in the sense winding of read head 19 may appear as that shown in FIG. 3*c*. Each positive and negative voltage peak extending from line V represents a data bit. However, only peaks 62 extending beyond voltage levels C from line V are effective to represent a data bit in the read circuit; peaks 63 at particles 60 do not represent data bits to the read circuit because they are of insufficient strength to be distinguished from noise which was clipped at levels C. Thus, the presence of extraneous particles prevents accurate sensing of all data bits recorded in the tape. Although weak signals 63 appear only at particle locations in the figure, these omitted signals may extend for several bit positions each side of a particle.

A diagram of a multi-track tape is provided in FIG. 4. The tape comprises seven parallel tracks and has designated therein possible data bit positions 64. A particle 60 is shown as rendering some bit positions of tracks 4 and 5 ineffective. Bit positions in the other tracks adjacent the particle, transversely of the tape, may be unaffected by the particle. However, a data character formed of particular bit combinations transversely of the tape would be erroneously sensed.

In FIG. 1, there is shown a cleaning device selectively operable to remove extraneous particles 60 from the surface of tape 10. When a defective tape area is sensed by read head 19 and a detection circuit, as the tape moves to the right, the defective area is stopped at cleaning head 22, by a control circuit. The detection and control circuits are described hereinafter. The cleaning head is normally in the position shown while tape 10 is being moved. After the tape is stopped and particles are to be removed from its surface, the cleaning head is rotated in a clockwise direction about a pivot 70 on plate 71 which is secured by any suitable means to face panel 38 of the tape transport unit. Head rotation is accomplished by energizing motor 73 to, in turn, rotate belt 74 operatively connected to cleaning head 22. As the cleaning head is rotated in a clockwise direction, blades 75 and 76 secured to the head come into contact with and scrape across the underside of the tape to shear off particles adhering to the surface of the tape. While head 22 rotates in a clockwise direction, blade 75 provides shearing action by approaching the tape at an acute angle therewith; blade 76 merely scrapes across the tape surface and may or may not remove particles adhering to the surface. However, as soon as the blades have moved approximately 120° from the position shown, reversing switches, described below, are actuated which cause motor 73 to rotate head 22 in an opposite direction so that blade 76 approaches any remaining particles with a shearing action in an attempt to dislodge the particles. The counter-clockwise motion continues until the blades again reach the rest position as shown. Blades 75 and 76, when in scraping contact with the tape, are of sufficient length to push the tape upward slightly out of its normal path to increase tape tension and effect closer shearing action.

The cleaning head and its operating and supporting structure are shown in more detail in FIGS. 5–8. Referring now particularly to FIG. 5, a hollow shaft 80 having a shoulder 81 is supported in plate 71 and secured therein by means of nut 82. The right end of shaft 80 is connected by means of an elbow 83 and hose 84 to any suitable vacuum source. Supported for rotation about shaft 80 by bearing 78 is a notched pulley 85 engaged with toothed-belt 74. Pulley 85 is secured by screws to cleaner head 22 which is supported by bearing 79 for rotation about shaft 80 so that as pulley 85 is rotated, head 22 will rotate with the pulley. The hole does not extend throughout the entire length of shaft 80 but a portion 77 remains so that a washer and thumbscrew may be secured thereto and maintain head 22 and pulley 85 on the shaft. Secured to the lower portion of plate 71 and spaced therefrom by any suitable means, such as spacers and screws, is an auxiliary motor plate 86 having supported therein for rotation shaft 87 and motor shaft 88. A spur gear 89 is secured to shaft 88 for rotation therewith and engages spur gear 90 which is fixed to shaft 87. A driving pulley 91 is fastened to spur gear 90 by screws 92 extending through the pulley hub into the spur gear. Thus, as reversible motor 73 (FIG. 1) rotates shaft 88, rotary motion is transmitted through gears 89 and 90 to rotate shaft 87 and pulley 91. This movement is transmitted through belt 74 to pulley 85 and cleaning head 22.

There is secured in the hub of pulley 91 a pin 93, as shown in FIG. 6, which is used to actuate switch 94 supported in L-shaped bracket 95 secured to the rear of plate 71, and to actuate switch 96 supported in L-shaped bracket 97 also secured to the rear of plate 71. These switches are used to control motor rotation and to produce a reset signal which will be described in detail hereinafter. Brackets 95 and 97 are used as limit stops for the rotation of pulley 91.

The motor used for rotating cleaning head 22 is preferably of the well-known shaded pole type adapted for constant energization even though its rotation is blocked. In this application, once the motor is energized it may remain so for long periods of time even though the cleaning head 22 is not being operated. After a cleaning cycle has been completed, motor 93 constantly attempts to turn pulley hub 91 seen in FIG. 6 in a clockwise direction against stop 95 until the next cleaning cycle is initiated.

Cleaning head 22 is shown in rest position in FIG. 7. While the head is in this position the tape is moving over the head in contact with perforated plate 98 secured to the head by screws 99. The plate serves to clean minor accumulations of dust from the tape but does not clean all particles adhering to the tape surface. The plate serves merely as an auxiliary cleaning device which is constantly in operation to keep dust accumulation at a minimum. Blades 75 and 76 are attached to head 22 by means of plates 100 and screws 101. The blades extend beyond the periphery of the head so that loosened particles may fall downward between the blades for removal by vacuum. As best illustrated in FIG. 8, head 22 is provided with internal channel 102 for plate 98 and channels 103 and 104 for the blades, which interconnect with exhaust port 105 in hollow shaft 80 which is connected to vacuum source 106 (FIG. 6). It will be remembered that shaft 80 does not rotate. Therefore, during normal tape movement channel 102 is interconnected with port 105 so that dust loosened by the hole edges in plate 98 is removed through the vacuum port and shaft 80. However, when the tape is stationary and the head 22 is rotated in a counter-clockwise direction as seen in FIG. 8, channels 103 and 104 will interconnect with port 105 at aproximately the time blades 75 and 76 contact tape 10. The two channels will remain in contact wtih vacuum port 105 during the shearing operation by the blades on the tape surface. Upon return of the head to its rest position channel 102 will again be aligned with vacuum port 105.

Shown in FIG. 9 is a schematic illustration of the tape deflection caused by blades 75 and 76 as they rotate against the tape surface. It can be seen that with the head rotating in a clockwise direction in the position shown in solid line that blade 75 forms an acute angle with tape 10. As blade 75 moves along the lower surface of the tape, extraneous particles will be sheared from the oxide coating and loosened particles will fall onto head 22 and for removal by the vacuum source. Guide bar 21 and idler 23 maintain the tape against the blades during the shearing and scraping action. The increase in tension at this point is limited, however, because the tape can move to the left around idler 23 and rise slightly out of the vacuum column 25. As the cleaner head completes its clockwise rotation, the resulting direction reversal engages blade 76 at an acute angle with the tape surface so that the extraneous particles still adhering may be sheared by that blade.

The operating circuits for the tape transport mechanism and cleaning device are shown in FIGS. 10*a* and 10*b* and the timing diagram for this circuit is shown in FIG. 11. In the circuitry of the apparatus described, electrical signals may assume one of two voltage levels, each of which represents the presence of certain predetermined conditions according to techniques well known in the art. These signal levels are identified as "positive" and "negative" to differentiate between them and these terms merely identify the signal voltages relative to each other, irrespective of their relationship to some arbitrarily selected "ground" potential.

In the circuit diagram certain elements are shown symbolically for the sake of simplicity and clarity of the drawing. The circuits represented by these symbols are all well-known in the art and will be described only briefly to review their function.

The symbol "READ CKT" represents the circuit necessary to sense a discrete magnetized area representing a bit in a data track on the tape. For each bit sensed by read head 19, a positive pulse is produced which is used to set a bistable trigger in the On condition.

The symbol "T" represents a conventional bistable trigger having an Off condition when the right side is conducting and an On condition when the lef side of the trigger is conducting. The outputs of the trigger are at the right and the left side. Thus, if a trigger is Off the output voltage at the right side will be down relative to the output at the left side which is up. When the trigger is turned On the output voltage levels change to an opposite relationship. Either a negative signal at the lower righ input or a positive signal at the lower left input will turn the trigger On. Opposite inputs will turn it off.

The symbol "A" represents a coincidence AND gate in which all inputs to the gate must be in a predetermined like condition before an output signal is provided. In this circuit all inputs must be positive before a positive output signal is produced. For example, the left output of an Off trigger will provide a conditioning signal to the AND gate, while the right side would block the gate.

The symbol "O" represents a conventional OR gate in which an input signal on either of the input lines will cause an output signal of the same polarity to be provided. Thus, in a two input OR gate, a positive input signal and a negative input signal will provide a positive output signal.

The symbol "$I_{PF}$" is a pulse-forming inverter which utilizes the negative slope of a positive input signal to provide a sharp positive output pulse.

The symbol "$I_{PD}$" represents a pull-over inverter for a holdover signal shot. It utilizes positive input pulses to produce negative output pulses that are applied to a single shot ($SS_D$) to maintain the left side of the single shot conducting (down) as long as the repetition rate of pulses coming into the pull-over inverter is greater than the single shot timing.

The symbol "$SS_D$" represents a holdover signal shot (monostable multivibrator) which will provide a signal output of a predetermined time interval when a signal is received at the input shown at the lower right corner in the circuit schematic. As long as the subsequent signals are received prior to the termination of the timed signal output, the output signal will be extended and will terminate at the predetermined time interval after the receipt of the last input pulse.

The symbols "$SS_E$" and "$SS_F$" are used to designate single shots (monostable multivibrators) which upon being pulsed by a negative signal at the left input or a positive signal at the right input, will go On to produce a signal output of a predetermined time interval. The right side of a single shot is commonly conducting so that its output is down and the output of the left side is up, but when a signal is applied to turn On the single shot, the outputs go to opposite levels for the predetermined time interval. An $SS_F$ produces a faster left output signal than an $SS_E$.

In detecting extraneous particles adhering to the surface of the magnetic tape 10, a data bit is recorded in each bit position in each track of the tape. This is accomplished by applying write pulses to each track write head 18 by means of a write circuit. Referring first to FIG. 10*b*, there is shown a conventional write circuit 140 comprising a multivibrator 141 driving bistable trigger 142 which, in turn, drives inverter 143 which produces current alternately in each of the two write coils 144 for track write head 18. Each multivibrator pulse changes the state of the trigger so that the outputs of the trigger cause the two outputs of the inverter to alternately conduct. The circuit differs from the usual write circuit only in that the write coils for each track are not controlled for writing particular data, but are constantly writing a data bit in each successive bit position for each track. The write coils for each track are all controlled by common multivibrator 141 to record in each bit position simultaneously and produce the pattern shown schematically in FIG. 4 as rows 65. These data signals are applied to tape 10 by write head 18 placed to the left of read head 19 in FIG. 1 so that as the tape to be examined approaches head 19 all bit positions may be assumed to have data recorded therein. Although all write heads and all read heads may be at two separate locations, a magnetic transducer of the type disclosed in U.S. Patent No. 2,922,231 issued on January 26, 1960, to V. R. Witt et al., is preferable because the two heads are physically close together in a single unit and yet may be operated simultaneously with the advantage that less space is required for the two types of heads.

For purposes of describing the circuit in FIGS. 10*a* and 10*b*, assume that the data bit position of each track of a multi-track tape, for example the 7-track tape shown in FIG. 4, is being recorded with a data bit in each bit position by the write circuit described above. Assume also that the tape transport mechanism is in stopped position. To initiate the detection of surface defects on tape 10, switch 150 is closed by an operator to provide a positive signal turning Start trigger 151 On. This causes the left output of the trigger to go negative which is coupled through a capacitor to forwardly bias the diode at the right input of Go trigger 152 so that a negative pulse is formed to turn the trigger On. The output of the Go trigger thus becomes positive, serving as the left input to turn Start Delay single shot 153 On and to provide a positive input at AND gate 154. The left output of single shot 153 goes negative for a fixed time, e.g., 50 milliseconds, to reset Read Register triggers 184 Off and to block AND gate 155, and holds the output of AND gate 155 negative. This output serves as the Read Status for read circuits 183 at tracks 1–7 and prevents any tape data from being read for the period of time that single shot 153 is On. Returning now to AND gate 154, it will be noted that two other conditioning inputs are necessary before the positive output signal will result. These positive input signals are present when Stop Delay single shot 156 is Off and Cleaner trigger 157 is Off. Single shot 156 and trigger 157 may be assumed Off at the start of an inspection operation. Therefore, since the three positive inputs are present at AND gate 154, a positive output exists which is applied on line 158 to condition AND gate 155 still held down by start delay 153; this positive output is also applied to the stop-drive circuit 159 through inverter 160 and line 161.

As line 161 goes up, tubes 162 and 163 start to conduct because their grids are positive. The output of tube 162 is fed to tubes 164 and 165. Tube 164 is biased below cut-off normally so the negative shift in the plate circuit of tube 162 has no effect. Tube 165 is driven to cut-off. Tube 163 begins conducting and its plate output is tied to tube 166 which is driven to cut-off. Because the positive start signal was also applied in inverter 160 the output of the inverter goes negative, cutting off tubes 167 and 168. Tube 169 is driven into conduction. Tube 170, having its grid A.C. coupled through capacitor 171 to the plate circuit of tube 167, will go into conduction as tube 167 goes off but the conduction will last only a short time depending upon the time constant of capacitor 171. It will be noted that tubes 169 and 170 are effectively in parallel and both are connected to moving coil 46. Since tube 168 was cut off, its plate circuit will go positive causing tube 172 to conduct. Because parallel tubes 169 and 170 supply the cathode of tube 172 through moving coil 46 a temporary heavy current will be obtained to cause moving coil 46 to be rapidly repelled from permanent magnet 47 of FIG. 2. As the voltage across capacitor 171 goes negative, tube 170 will cease conduction. By this time moving coil 46 will have been repelled so that tube 169 can provide sustaining current to the coil. It will be recalled from the description of FIG. 2 that as moving coil 46 is repelled upward moving rod 50, that either tape moving pulley 24 or 15 will be engaged with a respective drive capstan 30 or 32 to move the tape either in a forward or a reverse direction. When the start signal on line 158 goes down, the output of the inverter 160 becomes positive and the signal on line 161 becomes negative. Thus, tubes 162 and 163 are cut off and tubes 167 and 168 begin to conduct so that the moving coil 46 moves downward to engage tape moving idlers 24 or 15 with a stop capstan 35 or 34, respectively.

Attention is now directed to forward-reverse circuit 175. This circuit controls the direction in which the tape is moved by energizing either reverse magnet 44*a* or forward magnet 44*b*. In the absence of a positive signal from OR gate 176, tube 177 will be cut off so that the grid of tube 178 is positive driving the latter into conduction to energize forward coil 44*b* in the plate circuit. This provides a bias for forward tape movement. However, when a positive reverse signal is produced through OR gate 176, tube 177 will conduct so that reverse magnet 44*a* is energized. The conduction of tube 177 thus lowers the grid potential of tube 178 so that the tube 178 is cut off.

The action taking place to this point starts tape movement in a forward direction and may be summarized by considering the timing diagram of FIG. 11. Upon closing start switch 150, the output of Start trigger 151 went negative as shown by wave form (*a*) and turned On Go trigger 152 shown by wave form (*b*). The positive output of the Go trigger conditioned AND gate 154 so that a start signal was produced to energize moving coil 46. Since no reverse signal was present from OR gate 176, the tape transport mechanism was biased for movement in a forward direction and the tape therefore, begins to move forward over heads 20 as illustrated by wave form (*d*). Since line 158 is positive, it provides one input to AND gate 155. Since no tape defects have yet been detected, both lines 180 and 181 supply positive inputs to AND gate 155. Therefore, when start delay 153 times out and goes positive, AND gate 155 will supply a positive signal to read circuits 1–7 along Read Status line 182. This conditioning of the read circuits is shown in wave form (*e*).

Read head 19 may now begin to read all information tracks of the tape simultaneously. Head 19 is represented by read circuits 1–7 with sense coils as inputs thereto. If no defect appears on the tape surface, each of the seven read coils will sense a data bit and cause its respective read circuit 183 to turn On the related Read Register trigger 184. The outputs of all triggers 184 are supplied as inputs to AND gate 185 and to OR gate 186. When all inputs are present at gate 185, a positive output will be produced as an input to AND gate 187 where it will be blocked until a second positive input is provided. In order to overcome skew in a multi-channel tape, the first trigger 184 to be turned On will provide a positive signal through OR gate 186 to turn On Character Gate single shot 188. The output of this single shot is positive and serves as the second input to AND gate 187 and also as an input to AND gate 189. Single shot 188 provides a timing pulse within which all read circuits must provide a signal sindicating that a data bit has been sensed in its track.

Assuming for the moment that each track head has sensed a bit, AND gate 187 will be conditioned to provide a positive pulse to OR gate 190. As the Character Gate times out, the signal from Or gate 190 will go negative and cause pulse-forming inverter 191 to produce a sharp positive pulse which serves as a reset along line 192 for read registers 184 to thus condition them for receipt of the next bit sensed by their respective read head coils. The positive pulse from inverter 191 will pass through OR gate 193 to pull-over inverter 194. Inverter 194 will produce a negative output to turn On Holdover single shot 195 for a predetermined time. During the time that single shot 195 is on, all read coils of head 19 should sense another bit in their respective channels to thereby produce another input to inverter 194 as just described. As long as each successive input pulse is supplied to inverter 194 before single shot 195 times out, the single shot will remain On. However, if one of the read coils fails to turn On its Read Register trigger 184, no pulse will be produced through AND gate 185. Hence, AND gate 187 will block any signal, allowing single shot 195 to time out so that its output will go positive and produce a positive pulse across capacitor 196.

The foregoing sequence of events is illustrated in FIG. 11 at wave form (*f*) where the Read Register pulse is missing at 197. This causes the omission of a reset pulse on wave form (*g*) at 198 and a positive signal level at the single shot 195 on wave form (*h*) at 199. At the time some triggers 184 failed to go On, indicating an error, continued tape movement may turn On all triggers. However, normal reading does not resume because no reset pulse occurred on line 192 at error time. OR gate 186 is maintained positive so that no positive voltage shift can occur to cycle Character Gate single shot 188. Thus, AND gate 187 remains blocked while all triggers 184 may be On.

The error pulse is applied at three AND gates 200, 201, and 202 as a conditioning signal. AND gate 200 is conditioned by two other inputs, one indicating that the Start Delay 153 is not On and the other being a start signal from AND gate 154 so that at the arrival of an error pulse, gate 200 produces a positive pulse which turns On counter Reset trigger 203. When turned on, the output of this trigger is negative and is applied to block AND gate 204. The second input to gate 204 is the output from Retest single shot 205 which produces a conditioning pulse through capacitor 250 when the single shot goes off. The operation of single shot 205 will be described below.

As mentioned, the error pulse from capacitor 196 is also applied to AND gate 201 and 202. At gate 201 two other conditioning inputs are required. One of these inputs is a start line which is positive as an output from AND gate 154. The other input is fed from counter 206 indicating that the last cleaner error has occurred for this defective portion of the magnetic tape. Since this is the first error, the third input then is not present at AND gate 201 and no signal will be produced therefrom. A positive signal to condition AND gate 201 will be produced only after a single tape area has produced an error signal and has been cleaned a predetermined number of times. This situation is described below.

However, at AND gate 202, which requires four inputs, the arrival of the error pulse finally conditions the gate so that a positive output is produced. One of these conditioning inputs is a positive signal indicating Start Delay 153 is Off, another is that a start signal exists from gate 154, and the third is from counter 206 indicating that the last error on this defective portion of the tape has not yet occurred. Thus, the positive output from gate 202 is produced and is applied to Cleaner Delay single shot 207. As seen in FIG. 11 at wave form (*l*), the Cleaner Delay single shot output comes up at substantially the same time the error pulse 199 occurred. The purpose of Delay 207 is to provide timing means for applying a stop signal to the tape transport mechanism when a defective tape area has been detected. As seen in FIG. 1, when the defective tape area has been detected at read head 19, it must move to approximately the center of cleaner head 22 where it is then stopped so that the cleaning head may be rotated to shear the particles from the tape surface. Therefore, when single shot 207 times out, the negative slope of the timed positive signal is applied to turn Cleaner trigger 157 On through a capacitor and diode.

As Cleaner trigger 157 turns On, the negative signal at the left output thereof blocks AND gate 154 to terminate the start signal on line 158 so that stop-drive circuit 159 pulls moving coil 46 downward. This action engages tape moving idler pulley 15 with forward stop capstan 34 as seen in FIG. 2. Thus, with the timing signal of Cleaner Delay 207 accurately set, the defective tape area will be stopped directly over cleaning head 22. The negative output of trigger 157 is also tied to line 208 and to Reverse single shot 209 but has no effect thereon since a positive pulse is necessary to turn On the single shot. When the left output of cleaner trigger 157 went negative, the right output went positive and this positive signal is applied along line 210 to relay Driver 211 and to line 212 from counter 206.

The positive signal from Cleaner trigger 157, when applied to relay Driver 211, is amplified sufficiently to energize relay R1 which in turn transfers contacts R1–1 and opens contacts R1–2. This causes the cleaner motor 73 to rotate in a clockwise direction when the shaded pole winding 213 is closed. Motor 73 continues to rotate and to move blades 75 and 76 as seen in FIG. 1 across the defective area of the tape until the clockwise limit switch 96 (FIG. 6) closes. The closure of switch 96 energizes the latch pick coil LP of relay R–2 which closes contacts R2–1, opens contacts R2–2 and closes contacts R2–3 and R2–4. This action opens clockwise winding 213 at contact points R2–2 and closes the counterclockwise winding 214 through contact points R2–1 with the result that cleaner motor 73 reverses direction and rotates blades 75 and 76 and cleaner head 22 in a counterclockwise direction to the position shown in FIG. 1. When the cleaning head reaches its home position, pin 93 on pulley hub 92 (FIG. 6) closes switch 94 with the result that ground potential is applied through contacts R2–4 along line 215 to the left input of Cleaner trigger 157 to thereby turn the trigger Off. As the trigger goes Off, its right output goes negative so that relay R1 is no longer energized by a driver 211. As relay R1 drops, the latch trip coil LT of relay R2 is energized through now closed contacts R1–2 and R2–3 permitting relay R2 to drop. When relay R2 drops contacts R2–1 open, contacts R2–2 close, and contacts R2–3 and R2–4 open. When relay R1 dropped, contacts R1–1 also transferred to the position shown in FIG. 10*a* with the result that counterclockwise winding 214 remains closed so that motor 73 constantly attempts to turn pin 93 on pulley hub 92 against bracket 95 (FIG. 6). Motor 73 will remain energized in this condition until again actuated by Cleaner trigger 157 being turned On.

As soon as the right side of Cleaner trigger 157 went negative, Error Counter 206 was advanced by the negative signal appearing on line 212 and a capacitor at the input to binary trigger 216 to turn the trigger On. Binary triggers 216, 217, and 218 are provided to control the number of times that a defective tape area is cleaned and retested. Each time that the same tape area is cleaned these triggers will advance until trigger 218 has been turned on so that its right output will condition AND circuit 201 and block AND gate 202. Any number of counter triggers may be provided to limit the number of times that a single defective tape area is cleaned and retested. As is evident from the circuit, the counter illustrated can be advanced to four cleaning cycles. Counter 206 is thus a means for limiting the cleaning of a defective area for a predetermined number of times.

When Cleaner trigger 157 is turned Off, the left output goes positive and appears as a conditioning signal for AND gate 154, and also appears on line 208 to turn On Reverse single shot 209 through capacitor 219. The left output of single shot 209 appears on line 181 and blocks AND gate 155 to pull down Read Status line 182 and thereby prevent read heads 19 from actuating read circuits 183. The right output of Reverse single shot 209 at first goes positive and appears on lines 220, 221, and 222 to produce a positive output from OR gate 176. This reverse signal actuates magnet 44*a* through tube 177 and cuts off tube 178. This results in moving arm 43 of FIG. 2 to the left dropping tape moving idler 15 one half gap below tape moving idler pulley 24. Since AND gate 154 was conditioned when Cleaner trigger 157 went Off, and the other two inputs to the AND gate are present, a start signal is produced on line 158 which appears at stop-drive circuit 159 so that moving coil 46 will be repelled upward (FIG. 2) to engage moving idler pulley 15 with reverse drive capstan 32. Tape moving idler pulley 24 was disengaged from forward drive capstan 30 when tape moving idler pulley 15 was engaged with reverse drive capstan 32, so that now the tape begins to move in a reverse direction. Reverse tape movement will continue until Reverse single shot 209 times out. At that time the right output of the single shot will go negative and a negative pulse is applied through capacitor 223 to turn On Stop Delay single shot 156. The left output of single shot 156 produces a negative signal on line 224 which blocks AND gate 154 so that the start signal is removed from line 158 and stop-drive circuit 159. This causes control rod 50 of FIG. 2 to be moved downward by moving coil 46 so that tape moving idler pulley 24 is engaged with reverse stop capstan 35. Tape moving idler pulley 15 is disengaged from reverse drive capstan 32. The negative signal on line 224 is also sent to Start Delay single shot 153 to initiate a timing cycle therein so that the output of the Start Delay resets Read Register triggers 184 Off and blocks AND gate 155 to in turn hold down read status line 182.

Returning now to the negative output of Reverse single shot 209, it will be seen that this signal is applied through capacitor 225 and a diode to turn off Counter Reset trigger 203. The resulting positive output from trigger 203 appears at AND gate 204. The negative signal from the Reverse single shot is also applied to Retest single shot 205 so that a timing cycle is initiated therein. The resulting negative output signal blocks AND gate 204 until the single shot 205 turns Off when the positive slope of the pulse will appear across capacitor 250 to fully condition AND gate 204. However, the Counter Reset input from trigger 203 may again go negative before the positive pulse appears from Retest single shot 205 if an error is detected upon recheck of the cleaned tape portion which has been reversed for retesting. Leaving counter reset trigger 203 for the moment, it will be seen that the negative signal from single shot 209 is also applied to Start Reset single shot 227 along line 220 to initiate the timing cycle therein.

The foregoing sequence of events can best be illustrated by referring to FIG. 11. As the Reverse single shot was turned On as shown at wave form (*n*), the reverse signal was applied to the tape transport unit as shown by wave form (*p*) and a start signal was applied as shown by wave form (*d*). The tape thus moves in reverse until Reverse single shot 209 has timed out so that the reverse signal of wave form (*p*) dropped and turned On Stop Delay 156 at wave form (*q*). Stop Delay 156 went negative to block the start signal at wave form (*d*). The Stop Delay is provided to give the tape time to stop in the reverse direction and is a relatively short delay as seen by the wave form (*q*). As soon as Stop Delay 156 times out, it again conditions AND gate 154 so that a start signal is applied on line 158 to stop-drive circuit 159 as shown by wave form (*d*). Since the reverse signal does not now appear at OR gate 176, forward coil 44*b* will be energized and the tape will proceed in a forward direction.

Write circuit 140 will be recording data bits on the tape as it moves. However, no information will be read from the tape by read heads 19 until Read Status line 182 is conditioned as illustrated in wave form (*e*), which is controlled by Start Delay 153. The Start Delay has a longer timing cycle than Stop Delay 156 so that the tape is moving in a forward direction but no data are being read by read heads 19. As soon as Start Delay 153 times out, the read register will start producing pulses for each data bit position. However, any information coming from pulse-forming inverter 191 will be overridden by the output of Start Reset single shot 227 which has a slightly longer timing cycle than Start Delay 153. This auxiliary Start Reset single shot 227 is provided to insure that the tape is moving forward at normal sensing speed and has settled down so that erroneous signals are not caused by tape skew.

While single shot 227 is timing out, it applies a positive signal to AND gate 189 where it is coupled with the output of Character Gate 188 so that a signal is provided through OR gate 190 and pulse-forming inverter 191 to, in turn, provide reset signals for Read Registers 184 before single shot 227 has timed out. The positive output of this single shot is also applied through OR gate 193 and pull-over inverter 194 to turn On Hold-Over single shot 195 and keep it On until the read register signals resume control by producing pulses at a repetition rate sufficient to keep the Hold-Over single shot On.

It will be recalled that Reverse single shot 209 turns On Retest single shot 205 shown by wave form (*u*). The Retest single shot has a relatively long timing cycle, e.g., 140 milliseconds. During this timing cycle the cleaned area of the tape is moved forward over the read head and is rechecked by the detection circuitry described above. If no error occurs during the recheck of the tape, AND gate 204 supplies a positive pulse on line 228 which is applied as a reset signal to binary counter triggers 216, 217 and 218 of counter 206. However, should an error be detected upon rechecking the cleaned area, Hold-Over single shot will go positive and produce a pulse across capacitor 196 to condition AND gate 200 which will turn On counter reset trigger 203. The negative output of Counter Reset trigger 203 will block AND gate 204 so that no reset of the Error Counter will take place.

As a summary of operation up to this point, magnetic record tape 10 has recorded in each bit position of each channel identical data bits by write circuit 140 and write heads 18. A read circuit, operating through the read heads 19 senses the data bits recorded on the tape and detects the absence of a data bit in any tape track. When one or more data bits are not sensed by heads 19, an error signal is produced which stops the tape transport mechanism after a predetermined time so that the portion of tape producing the error is stopped over cleaning head 22. Cleaning head 22 is then rotated to move blades 75 and 76 across the surface of the tape to shear particles 60 from the tape. Upon completion of the cleaning cycle, the tape is reversed, halted temporarily, and then moved in a forward direction to determine whether or not the defect has been removed from the tape surface. If no error is found, the Error Counter is reset and tape examination proceeds normally.

However, if an error is detected during the timing cycle of Retest single shot 205, the error is considered to have occurred in the already cleaned tape portion and the counter will not be reset. When an error is encountered before counter 206 has been reset, the cleaning procedure is identical to that already discussed except that Start trigger 151 and Go trigger 152 are not actuated by an operator. The retest error pulse produced across capacitor 196 will again fully condition AND gate 202 to turn Cleaner Delay 207 On to initiate the sequence of stopping the tape, recleaning the defective tape portion, and returning the recleaned portion for rechecking again at heads 18 and 19. This sequence will be repeated up to four times in the circuit as shown. If Error Counter 206 is not reset after the first, second, third or fourth cleaning of a particular area, AND gate 201 will be conditioned to change the sequence of operation when the same tape area produces the fifth error.

At the end of each of the first four cleaning operations on a particular tape area, counter 206 is advanced one digit as Cleaner trigger 157 is turned Off by cleaner switch 94. The resulting negative pulse on line 212 produces the counter advance. The counter is a series of well-known binary triggers 216, 217 and 218. The first negative input pulse at trigger 216 turns it On and registers a "1." The second negative input pulse turns it Off. As trigger 216 goes Off its right output goes negative and supplies a negative input pulse to trigger 217 to turn trigger 217 On and register a "2." Thus, the triggers may be advanced by supplying sequential negative pulses to trigger 216. As trigger 216 is turned On again, triggers 216 and 217 together being On indicate a "3." The next pulse to trigger 216 causes it and trigger 217 to both go off with the consequence that trigger 218 goes On to register a "4."

When a particular defective tape area has been cleaned four times, trigger 218 will be turned On and produce a negative signal on line 230 which will block AND gate 202 so that upon retest of the tape, after the fourth error has occurred, an error pulse will not actuate Cleaner Delay 207 to stop the tape at cleaning head 22. Instead, the positive right output of trigger 218 is used to condition AND gate 201. Since the tape is moving in a forward direction, a positive signal is present on start line 158, and when the fifth error occurs the positive pulse is produced on line 231. As a result, AND gate 201 provides a positive output and turns On Exam Error trigger 232. The negative left output of trigger 232 blocks AND gate 155, pulling down Read Status line 182, which deactivates read circuits 183. The negative signal of trigger 232 is also applied on line 233 to turn On Exam Delay single shot 234 to initiate a timing cycle. The right output of single shot 234 will go positive for a predetermined time and then fall. During this time that single shot 234 is On, the defective tape area will move from read heads 19 past cleaning head 22 around tape moving idler pulley 24 down vacuum column 25 to a manual examination cam 235 as shown in FIGS. 1 and 12. At the end of the timing cycle, the negative slope of the signal from single shot 234 is applied on line 236 to turn Go trigger 152 Off through capacitor 237 so that AND gate 154 is no longer conditioned and the start signal is removed from line 158 causing the tape to stop at examination cam 235. The negative signal is also applied to turn Counter Reset trigger 203 Off which has been turned On by the fifth error pulse occurring at AND gate 200. Thus, the defective portion of the tape is not automatically cleaned after a predetermined number of attempts have been made by cleaning head 22. Instead, the defective tape portion was moved to examination cam 235 where an operator may then examine the defective portion and attempt to remove the surface particles or reject the tape.

The manual examination cam is shown in FIGS. 1 and 12. When the defective tape portion has been stopped at the cam, the operator presses handle portion 240 toward face panel 38. The handle portion is mounted on pivot 241 rotatably mounted in a bracket 242 secured to the rear of vacuum column 25. This actuation of handle portion 240 causes arm 243 to move in a counterclockwise direction carrying cam 235 toward the front of vacuum column 25. As the cam moves to the front, it twists defective portion of tape 10 to face the operator who may then examine the tape and determine what future action is to be taken.

If the operator finds that the extraneous particles have not been removed by the several cleaning optrations, he may then atempt to manually remove the particles and upon doing so retest the tape portion. To accomplish this, the operator depresses reset switch 245 which applies a positive reset signal to Start trigger 151, to Exam Error trigger 232 along line 246, and to all triggers 216, 217 and 218 of Error Counter 206 along line 247. Next, reverse switch 248 is depressed which turns On Start Reverse single shot 249, so that the resulting positive output from the single shot will apply a reverse signal to OR gate 176 and condition the tape feed mechanism for reverse movement. The positive output of single shot 249 is also applied via line 251 to line 158 for providing a start signal to stop-drive circuit 159. Thus, tape will reverse for a period of time determined by the timing cycle of single shot 249. The operator may then depress start switch 150 to repeat the process of automatic error detection and automatic cleaning, provided he has been able to correct the defect at the manual examination cam 235.

It will be noted from the foregoing description that each time the defective tape area is found, timed signals are used to move the tape from the heads 19 to the cleaner 22, or to move the tape area from the cleaner to a position back of the head, or to an examination cam. In the description of this circuit, representative times have been entered on the various blocks representing single shots. For example, cleaner delay 207 has the timing cycle of 23 milliseconds and the reverse single shot 209 has a timing cycle of 145 milliseconds. The times designated for each of the single shots are merely examples to show their relative timing in the system disclised in FIG. 1. Actual timing of each of the single shots will be determined by the distance between write and read heads 20 and cleaning head 22, and between heads 20 and examination cam 235. These times also will be affected by the speed of the tape transport mechanism and the distance between the write heads 18 and read heads 19, and by the stopping and starting time required by the tape transport mechanism.

It may have been noted during the description of the foregoing control circuits that no provision was made at the start of operations to insure that each trigger was in the Off state. Ordinarily when a trigger is first turned On, it may or may not be in the Off condition and reset circuits must be provided before starting operations to insure that each trigger is in the Off condition. These reset circuits have not been shown in order to simplify the drawings. The addition of such reset circuits is considered to be within the ability of one skilled in the art and therefore is not necessary in this description.

It is contemplated that this invention can be adapted for also inspecting a magnetic tape for the absence of all data bits by employing well known erase heads and rendering the write heads ineffective for each data track. This modification requires only that AND gate 185 not be used nor coupled with the output from Character Gate 188 at AND gate 187, but that the output from the Character Gate serve directly as an input to OR gate 190. As tape 10 passes forward the erase heads would attempt to erase all data bits in each track. If some defect was then present on the tape to prevent complete data-erasure so that one or more of read heads 19 sensed a data bit, read circuit 183 corresponding to the activated read head would turn On its trigger 184. The output of an On trigger 184 would then turn On the Character Gate which would consequently activate OR gate 190, pulse-forming inverter 191, OR gate 193, pullover inverter 194 and Hold-Over single shot 195. Single shot 195, at the end of its timed interval, would produce an error signal to initiate the tape cleaning cycle and re-examination described above.

While the invention has been particularly shown and described with reference to a preferred embodiment thereof, it will be understood by those skilled in the art, that the foregoing and other changes in form and details may be made therein without departing from the spirit and scope of the invention.

I claim:

1. Apparatus for processing a record member having data manifestations recorded therein, comprising, in combination:
   - sensing means progressively acting upon said member for providing an indcation when a portion of said member has no data manifestations therein; and
   - means responsive to said indication for cleaning said portion of said member.

2. Apparatus for processing a record member adapted to have data manifestations magnetically recorded thereon, comprising, in combination:
   - means for progressively recording said manifestations on said member;
   - means progressively sensing said member for the presence of said manifestations, operable for providing an indication when an area of said member fails to produce said manifestations; and
   - means responsive to said indication for selectively cleaning said area of said member.

3. Apparatus for removing extraneous surface particles from a magnetic record member when said particles prevent the recordation of a predetermined magnetic pattern within said member or the sensing of a predetermined magnetic pattern within said member, comprising, in combination:
   - means for recording a predetermined magnetic pattern within said member;
   - means including sensing means for sensing the magnetic patterns recorded within said member and for providing an indication that a particular surface portion of said member is defective when said sensed pattern deviates from said predetermined pattern; and
   - means responsive to said indication for cleaning said particles from said particular surface portion of said member.

4. Apparatus for processing a magnetic record member, comprising, in combination:
   - detection means operating on said member for providing an indication when a portion of said member produces an irregularity between a magnetic flux arrangement applied thereto and the flux arrangement sensed therefrom; and
   - cleaning means actuated by said indication for selectively cleaning said member portion.

5. Apparatus for processing a magnetic record member having extraneous particles on the surface thereof, comprising, in combination:
   - sensing means including indicator means operable for sensing in a portion of said members an irregularity between the magnetic flux arrangement applied thereto and the flux arrangement sensed therefrom, and producing an error indication upon the occurrence of said irregularity;
   - means activated by said error indication for scraping the surface of the portion of said member producing said irregularity; and
   - means controlled by said scraping means for operating said detection means to subject said scraped portion to said operating detection means.

6. Apparatus for processing a magnetic record member, comprising, in combination:
   - detection means operating on said member for providing an indication when a portion of said member produces an irregularity between a magnetic flux arrangement applied thereto and the flux arrangement sensed therefrom;
   - cleaning means activated by said indication for scraping said member portion; and
   - means controlled by said cleaning means for resubjecting said cleaned member portion to said detection means.

7. Apparatus for processing a magnetic record member having a predetermined magnetic flux pattern created therein, comprising, in combination:
   - transport means for moving said record member;
   - detection means adjacent said member for providing a control signal upon detecting a portion of said member having a flux pattern deviating from said predetermined pattern;
   - means actuated by said control signal for stopping said transport means; and
   - means controlled by said stopping means for cleaning said detected portion of said member.

8. Apparatus for processing a magnetic record member, comprising, in combination:
   - transport means for moving said member along a fixed path;
   - means for creating a predetermined flux pattern in said member;
   - detection means including indicating means for sensing the flux pattern created in said member and for providing a control signal upon detecting a portion of said member having a flux pattern deviating from said predetermined pattern;

means responsive to said control signal for stopping said transport means; and
means adjacent said path actuated by said stopping means for cleaning said detected portion of said member.

9. Apparatus for cleaning a magnetic record member of extraneous particles on the surface thereof when said particles interfere with the creation or sensing of a magnetic flux pattern in said member, comprising, in combination:
transport means for moving said member along a selected path;
means for producing a predetermined pattern of magnetic flux in said member;
detection means including indicating means for sensing the flux pattern in said member and providing a control signal upon detecting a portion of said member causing said sensed flux pattern to deviate from said predetermined pattern;
means operable for cleaning the surface of said member and located adjacent said path;
means actuated by said signal for stopping said transport means when said member portion arrives at said cleaning means; and
means controlled by said stopping means for operating said cleaning means.

10. Apparatus as described in claim 9 wherein said cleaning means includes an oscillatable blade for scraping the surface of said member portion.

11. Apparatus as described in claim 9 wherein said cleaning means includes a pair of opposed oscillatable blades for scraping said member portion in opposite directions.

12. Apparatus as described in claim 9 wherein said cleaning means includes a vacuum source, a base, a sleeve member mounted in said base and connected to said source, a support rotatably mounted on said sleeve having a pair of internal channels interconnected with said source and the periphery of said support through said sleeve, a pair of blades on said support, each adjacent one of said channels at the periphery of said support, and means for oscillating said support about said sleeve so that said blades scrape in two directions against said member portion to loosen said particles, whereby said loosened particles are removed by said source.

13. Apparatus for processing a magnetic record member comprising, in combination:
detection means operable on said member for providing an error indication when a portion of said member produces an irregularity between a magnetic flux arrangement applied thereto and the flux arrangement sensed therein;
reversible transport means operatively biased for moving said member in a forward direction in operative relationship with said detection means;
cleaning means adjacent said member activatable for scraping the surface of said member;
control means responsive to said error indication for stopping said transport means and activating said cleaning means as said member portion arrives at said cleaning means; and
means controlled by said cleaning means for temporarily overriding said forward bias of said transport means to move said transport means and said member in a reverse direction until said cleaned portion arrives at said detection means, whereby said cleaned portion is subjected to the operation of said detection means.

14. Processing apparatus for a magnetic record member, comprising, in combination:
reversible transport means biased for moving said member in a forward direction;
detection means operable on said member for providing an error indication when a portion of said member produces an irregularity between a magnetic flux arrangement applied thereto and the flux arrangement sensed therein;
means responsive to said indication for stopping said transport means;
cyclically operable means actuated by said stopping means for cleaning said irregularity-producing portion of said member;
means controlled by said cleaning means for reversing said transport means to move said cleaned portion to said detection means at the completion of a cleaning cycle; and
counter means controlled by said cleaning means for counting each cleaning cycle.

15. Processing apparatus for a magnetic record member comprising, in combination:
reversible transport means biased for moving said member in a forward direction;
detection means operable on said member for providing an error indication when a portion of said member produces an irregularity between a magnetic flux arrangement applied thereto and the magnetic flux arrangement sensed therein;
means responsive to said indication for stopping said transport means;
means actuated by said stopping means for cleaning said irregularity-producing portion of said member;
mean controlled by said cleaning means for reversing said transport means to move said cleaned portion to said detection means;
a counter operated by said cleaning means for counting each actuation of said cleaning means; and
means controlled by said reversing means and said detection means for resetting said counter when said cleaned portion produces no error indication.

16. Processing apparatus for a magnetic record member, comprising, in combination:
reversible transport means biased for moving said member in a first direction;
detection means acting on said member in said first direction for providing an error signal when a portion of said member produces an irregularity between a magnetic flux arrangement applied thereto and the flux arrangement sensed therein;
cyclically operable cleaning means for cleaning a portion of said member;
means associated with said transport means operable for stopping said transport means;
first control means connected to said stopping means and said cleaning means, and responsive to said error signal for operating said stopping means when said irregularity-producing portion of said member reaches said cleaning means and initiating a single operating cycle of said cleaning means;
means coupled to said first control means and actuated by said cleaning means at the completion of each said operating cycle for overriding said bias and moving said transport means in a second direction until said cleaned portion reaches said detection means;
a counter connected to said first control means and adapted to be advanced by each operating cycle of said cleaning means for rendering said first control means ineffective upon reaching a predetermined count;
an examination station adjacent said member;
second control means connected to said counter and said stopping means and rendered effective by said counter upon reaching said predetermined count, and responsive to the next succeeding error signal for operating said stopping means when said irregularity-producing portion of said member reaches said examination station.

17. Apparatus for processing a magnetic storage record member having extraneous matter on the surface thereof adversely affecting the storage of said member, comprising, in combination:

reversible transport means biased for moving said member in a forward direction along a fixed path;

detection means on said path operable on said forward moving member for providing a control signal when a portion of said member produces an irregularity between the magnetic flux arrangement applied thereto and the flux arrangement sensed therefrom;

cleaning means adjacent said path and cyclically operable for cleaning said matter from said member;

first control means responsive to said control signal for stopping said transport means when said irregularity-producing portion of said member reaches said cleaning means and initiating an operating cycle of said cleaning means to clean said portion of said extraneous matter;

means connected to said first control means and controlled by said cleaning means for overriding said bias and reversing said transport means until said cleaned portion reaches said detection means;

a counter coupled to said first control means and said cleaning means and adapted to be advanced by each operating cycle of said cleaning means for rendering said first control means ineffective when a predetermined count is reached;

a manual examination station along said path; and second control means coupled to said counter and rendered effective by said predetermined count to respond to the next succeeding control signal for stopping said cleaned member portion at said examination station.

18. A scraping device for removing extraneous particles, comprising, in combination:

a shaft having a vacuum channel therein;

a support rotatably mounted on said shaft having a pair of internal channels communicating with said vacuum channel and a pair of peripheral ports in said support;

a pair of scraping blades fixed to said support and each located adjacent one of said ports for loosening said particles;

a vacuum source connected to said vacuum channel to create a vacuum at said ports;

a pair of limit stops for limiting rotation of said support;

reversible drive means for oscillating said support on said shaft between said stops; and control means for said drive means for moving said support through a single cycle of operations between said stops, whereby said particles loosened by said blades are removed by said vacuum source.

19. A device for cleaning extraneous particles from a record member, comprising:

a base;

a cleaning head rotatably mounted on said base for movement between a rest position and cleaning engagement with said member for removing said particles;

reversible drive means for rotating said head; and means controlling said drive means for rotating said head from said rest position into cleaning engagement with said member and returning said head to said rest position.

20. Apparatus as described in claim 19 wherein said cleaning head comprises a support rotatably mounted on said base and a pair of scraping blades engageable with said member.

21. A device for cleaning the surface of a record member of extraneous matter, comprising:

a base;

a vacuum source;

a scraping member rotatably mounted on said base and having a pair of intake ports connected with said vacuum source and a scraping blade fixed adjacent each said port, said scraping member being movable from an ineffective position into scraping engagement with said record member;

drive means for said scraping member;

operable means for controlling said drive means to move said scraping member from said ineffective position into said scraping engagement and return said scraping member to said ineffective position; and means for rendering said controlling means ineffective when said scraping member reaches said ineffective position.

22. Apparatus for detecting the presence of, and removing foreign matter from, the surface of a magnetic record member, comprising in combination:

means for recording a predetermined pattern of magnetism in successive portions of said record member;

sensing station means;

transport means for progressively submitting said successive portions of said member to said sensing station means;

said sensing station means including means to sense said pattern of magnetism and indictaing means responsive to said sensing means to indicate any deviation of the recorded magnetic pattern from the predetermined magnetic pattern occurring in a particular one of said portions;

cleaning means adapted to remove foreign matter from the surface of said record member; and control means responsive to said indicating means and adapted to bring said cleaning means and said particular one of said portions into coaction for removing foreign matter from said particular portion.

References Cited in the file of this patent

UNITED STATES PATENTS

| | | |
|---|---|---|
| 2,289,324 | Dettle | July 7, 1942 |
| 2,854,624 | Lubkin et al. | Sept. 30, 1958 |
| 2,937,368 | Newby | May 17, 1960 |
| 2,944,248 | Auerbach et al. | July 5, 1960 |
| 2,994,903 | Lawrance et al. | Aug. 8, 1961 |

UNITED STATES PATENT OFFICE

CERTIFICATE OF CORRECTION

ıtent No. 3,059,266 October 23, 1962

Norman G. Cleveland

It is hereby certified that error appears in the above numbered patıt requiring correction and that the said Letters Patent should read as ɔrrected below.

Column 2, line 14, for "cling" read -- clinging --; column , line 13, for "reexamination" read -- re-examination --; column , line 56, for "transfort" read -- transport --; line 59, for diengaging" read -- disengaging --; line 61, for "captan" read - capstan --; column 5, lines 29 and 30, for "capstant" read - capstan --; column 8, line 74, for "righ" read -- right --; olumn 11, line 46, for "sindicating" read -- indicating --; olumn 16, line 52, for "optrations" read -- operations --; ine 53, for "atempt" read -- attempt --; column 17, lines 8 ınd 9, for "disclised" read -- disclosed --; line 61, for 'indcation" read -- indication --; column 18, line 30, for 'members" read -- member --; column 20, line 27, for "mean" ·ead -- means --.

Signed and sealed this 13th day of August 1963.

SEAL)
ıttest:

ERNEST W. SWIDER
ıttesting Officer

DAVID L. LADD
Commissioner of Patents